United States Patent [19]

Formby

[11] 4,233,499

[45] Nov. 11, 1980

[54] CONVEYOR CONTROL APPARATUS

[75] Inventor: John A. Formby, Stratford-Upon-Avon, England

[73] Assignee: John Formby & Company Limited, Birmingham, England

[21] Appl. No.: 18,274

[22] Filed: Mar. 7, 1979

[30] Foreign Application Priority Data

Mar. 7, 1978 [GB] United Kingdom ............... 08953/78

[51] Int. Cl.[3] ........................ G06M 7/00; B65G 43/00

[52] U.S. Cl. .............................. 235/92 MP; 198/356; 198/502; 235/92 V

[58] Field of Search ............... 198/356, 358, 362, 366, 198/367, 370, 372, 502; 235/92 MP, 92 V, 92 PK, 92 GE, 92 CT; 340/674, 676; 414/134, 135

[56] References Cited

U.S. PATENT DOCUMENTS

| | | | |
|---|---|---|---|
| 3,743,090 | 7/1973 | Brown | 198/356 |
| 3,749,225 | 7/1973 | Kennedy | 198/366 |
| 3,778,833 | 12/1973 | Castrovillo et al. | 235/92 MP |
| 3,802,548 | 4/1974 | Wentz et al. | 198/502 |
| 3,816,712 | 6/1974 | Herzog | 235/92 MP |
| 4,004,904 | 1/1977 | Fergusson | 235/92 MP |

*Primary Examiner*—Joseph M. Thesz

*Attorney, Agent, or Firm*—D. Paul Weaver

[57] ABSTRACT

A conveyor control apparatus is presented wherein a plurality of discs containing light beam coding apertures are driven in synchronism with a conveyor assembly and provide optical control means for electronic circuitry which activates a plurality of on-loading stations and off-loading stations as a function of conveyor travel.

13 Claims, 6 Drawing Figures

FROM 25f (FIG 2)
FROM 25h (FIG 2)
36
37
38
39
42
43
46
47

50
51
52
53
54
55
56
57
58
59
60
61
62
63
64
65
66
67
68
69
70
71
72
73
74
75

CONVEYOR CONTROL APPARATUS

DESCRIPTION

1. Technical Field

The present invention relates to conveyor control apparatus for the purpose of controlling the on-loading and off-loading of consignments in relation to a conveyor.

An object of the invention is to permit of on-loading at a multiplicity of stations serially provided in relation to a conveyor, without interference at any station with any consignment already on the conveyor, and off-loading at a multiplicity of off-loading stations likewise serially provided.

A second object is to provide means by which, at any off-loading station, the on-loading point of any consignment to be off-loaded may be indicated and the consignment disposed of in one of a multiplicity of ways, according to the station of on-loading, as, for example, by the placing of the consignment on one of a multiplicity of subsidiary conveyors.

2. Brief Summary of Invention

In one form of the invention there are nine on-loading stations equally spaced apart and nine off-loading stations likewise. At each station there are nine lights, in the form of light emitting diodes, numbered one to nine. If a consignment is placed on the conveyor at station x when the y light is on it will arrive at station y when the x light is on, thus indicating that it was on-loaded at station x, and, moreover, the x light at station y is associated with means to activate a unique one of several off-loading devices at that station, whereby the consignment may be disposed of in a manner appropriate to consignments originating at station x. It is to be understood that x and y each take any of the values one to nine. Thus, if the conveyor is long enough, there may be eighty one consignments on the conveyor at the same time, each following a different route.

According to the invention rotary mechanical means adapted to move in correlation with a conveyor having a set of on-loading stations and a set of off-loading stations, is provided with means to apply a set of electrical signals to counting means and hence to decoding means having electrical outputs to gate means, a second set of signals to control the said gate means and a third signal to reset the said counting and decoding means, whereby a cyclical sequence of signals is transmitted to control indicator means associated with the said set of on-loading stations, whereby each member of the set may receive a sequence of signals by which the effective times of on-loading may be indicated in order that consignments on-loaded at such times may reach their respective off-loading stations during periods of activation of off-loading indicator means likewise associated with the set of off-loading stations and activated by like means.

According to an example of the invention, two wheels are driven at different but rationally related speeds in relation to the cyclical movement of a conveyor, so that the said wheels generate a cycle greater than the cycle of either wheel. Mounted in association with the wheels are two opaque discs having sets of concentric transparencies at different radial distances, one pair of such sets, comprising a set from each disc, providing signals in conjunction with photoelectric means to counter means and decoder means, whereby signals are transmitted to distinct channels to control indicator means associated with the said set of on-loading stations, and the said pair of transparencies also providing signals to flipflop means, a second pair of sets of transparencies providing means to reset the said flipflop means and thus to limit the duration of activation of the said indicator means. A third pair of sets is associated with means to reset the said counter means, whereby each member of the said set of on-loading stations may be associated with multiple indicator means by which effective times of on-loading may be indicated in order that consignments on-loaded at such times may reach their respective off-loading stations during periods of activation of off-loading indicators, activated by like means.

According to an embodiment of the invention two discs concentrically mounted are each associated with a spur gear wheel of ninety six teeth, driven through suitable intermediate gears by gears having forty eight and fifty teeth respectively mounted on an input shaft driven positively in relation to the drive of a conveyor. Thus, one of the discs gains one twenty fourth of a revolution for each complete revolution of the other, so that for every quarter revolution of the latter there is a gain of one ninety sixth. Accordingly, a set of nine holes is provided in the faster disc to be associated with a set of four holes in the slower disc, equally spaced. The holes are so placed that a pair, one from each disc cause coincident signals, each from a light emitting diode and phototransistor combination, every two and a quarter turns of the slower disc, providing nine equally spaced signals, followed by a longer interval and then repeating. These nine signals occuring in a cycle of twenty four rotations of the slower disc are applied, with suitable pulse shaping, to an electronic counter of the integrated circuit type and hence to an integrated circuit type selector, or decoder, as it is commonly known. The nine signals also provide inputs to a flipflop. A second assembly of holes similarly arranged provides nine signals to reset the flipflops and hence, by suitable gates, to limit the effective duration of the decoder outputs. A further pair of holes forming a third set provide a signal to reset the counter, and, hence, the decoder, after a count of nine. The decoder outputs, thus limited, provide signals to control indicator lamps at the on-loading stations.

A fourth assembly of holes is associated with similar means to provide seventeen successive signals which are applied to a second counter and decoder and a fifth assembly of holes provides another seventeen signals to limit the duration of the second decoder output. A pair of holes forming a sixth assembly provides a reset signal for the second counter and decoder. The outputs of the second decoder provide signals to control indicator lamps associated with the off-loading stations.

BRIEF DESCRIPTION OF DRAWINGS

In order that the invention may be more clearly understood, an embodiment will now be described with reference to the accompanying figures.

DETAILED DESCRIPTION OF INVENTION

Figure 1:
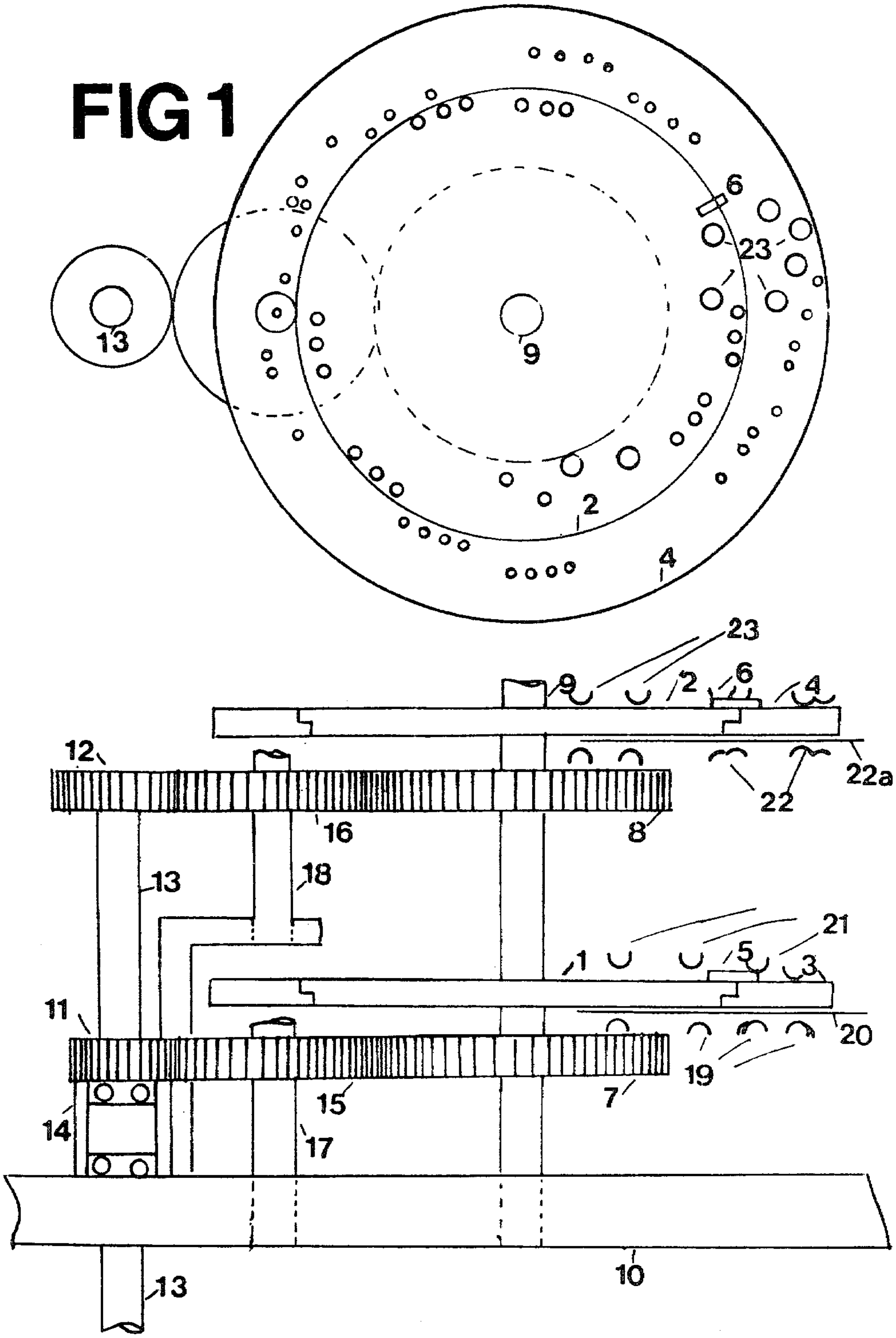
FIG. 1 shows two opaque discs, each with an adjustable annular ring, the discs being adapted to be driven at different speeds on a common axle and having multiplicities of sets of holes adapted, in cooperation with light sources and photoelectric means to provide signals.

Referring to FIG. 1, two opaque discs 1, 2 with annular rings 3, 4, rotatable with respect to the discs and securable in any desired relative position by screwed pads 5, 6 are attached concentrically to spur gears 7, 8 respectively having ninety six teeth and mounted on a pin or axle 9, which is a press fit in a hole in a baseplate 10. These discs are driven at different speeds by spur gears 11, 12 having forty eight and fifty teeth respectively, mounted on a common input shaft 13, which runs in bearings mounted in a tube 14 fixed to the said baseplate, the said spur gears driving the said discs through intermediate spur gears 15, 16 mounted on arms 17, 18 so as not to interfere with the said discs. The lower disc 1, which is the more slow moving, has two sets of four holes equally spaced, each set at a different radial distance and a third set comprising one hole only, and its associated annular ring 3 has a further three sets of holes likewise, while the faster disc 2 has four sets of holes, each at a different radial distance and the associated annular ring 4 has also four sets of holes likewise. In motion the faster disc gains one revolution in twenty four revolutions of the lower, so that in one quarter turn of the slower disc the faster gains one ninety sixth of a turn. Counting from the innermost radial distance, the sets of holes in the faster disc have one, one, nine and nine members respectively and the sets of holes in the annular ring have seventeen, seventeen, one and one hole respectively. The holes of each set of nine are in positions characterized by nought, three, six, thirty three, thirty six, thirty nine, sixty six, sixty nine and seventy two, in terms of a division of the circumference into ninety six equal parts. Likewise, the holes of each set of seventeen holes are characterized by nought, two, seven, twenty, twenty two, twenty five, twenty seven, forty, forty five, forty seven, fifty eight, sixty, sixty five, seventy eight, eighty, eighty three and eighty five, in terms of a division of the circumference into ninety six equal parts. Suitably mounted below the slower disc and annulus are six light emitting diodes 19 each at a radical distance corresponding to one of the radial distances of the disc and annular ring, together with a mask 20 and associated phototransistors 21, mounted on a panel on the upper side of the said disc, the panel being supported by suitable pillars from the baseplate. Likewise mounted below the faster disc and annulus are eight light emitting diodes 22 and a mask 22*a*, and mounted on a panel above the faster disc are phototransistors 23.

Figure 2:
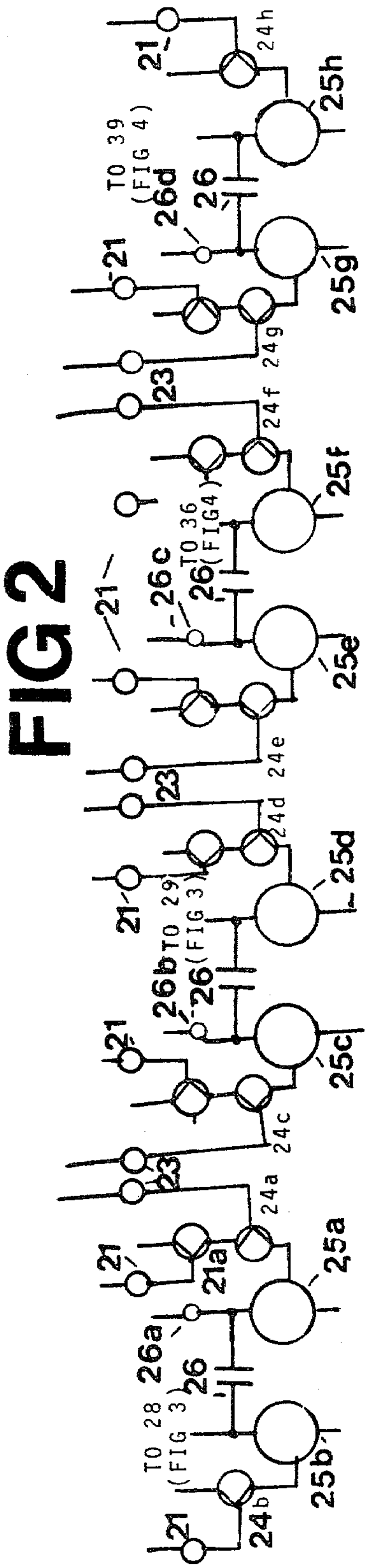
FIG. 2 shows how signals from phototransistors associated with the slower discs are combined with signals from phototransistors associated with the faster disc, to provide, by simultaneous application to two electrodes of a transistor, means to cause a thyristor to strike. Eight thyristors, coupled in pairs, provide signals to counting and decoding means.

Referring to FIG. 2, when light passes from a source 19 (FIG. 1) through a hole in the disc or annulus to phototransistor 21 and its associated amplifier 21*a*, a potential is applied to the collector of transistor 24 and when light passes from a source 22 to a phototransistor 23 aforesaid, a potential is applied to the base of a transistor 24 aforesaid. When potentials at base and collector coincide in time the said transistor 24 causes triggering of one of eight thyristors 25*a,b,c,d,e,f,g,h*. Six of these thyristors are triggered as described above and in the case of the other two, the associated transistor 24*b* and 24*h* has its collector permanently provided with potential. The said thyristors are coupled in pairs by capacitances 26, so that thyristors 25*a,b*; 25*c,d*; 25*e,f*; 25*g,h* are paired. A cycle of twenty four turns of the slower disc is initiated when thyristor 25*a* strikes and is restored after a very small movement of the discs by the striking of thyristor 25*b*. The primary purpose of these actions is to reset a counter (to be described by reference to FIG. 3 below) and for visual monitoring by means of a light emitting diode 26*a*. Thereafter, a similar sequence of operations concerning thyristors 25*c,d* occurs nine times, monitored by light emitting diode 26*b*, before the whole cycle repeats. Provision is made to supply power to these thyristors only after striking of thyristor 25*a*. Each of the nine operations provides a count of one and steps the decoder output (shown in FIG. 3). Thyristors 25*e,f* undergo a similar sequence of operations seventeen times in a cycle, monitored by light emitting diode 26*c*. The initiation of this cycle is by the on/off action of thyristors 25*g,h* monitored by diode 26*d*, but able to take place only after the action of thyristors 25*a,b* aforesaid. The phase of this second cycle of twenty four turns of the slower disc relative to the first may be predetermined by setting of the annular rings relative to their associated discs. Thyristors 25*b* and 25*h* are associated with transistors 24*b* and 24*h* aforesaid having permanent potentials at their collectors so that the said thyristors are dependent for the activation only on holes in the faster disc and annulus respectively, the other six being dependent on the coincidence of a pair of holes, one in each disc or annulus. Thyristors 25*a,c-,e,g* having in their anode circuits light emitting diodes 26*a,b,c,d* for monitoring purposes, and the anodes of thyristors 25*b,d,f,h* provide controlling voltages to circuits to be described by reference to FIGS. 3 and 4.

Figure 3:
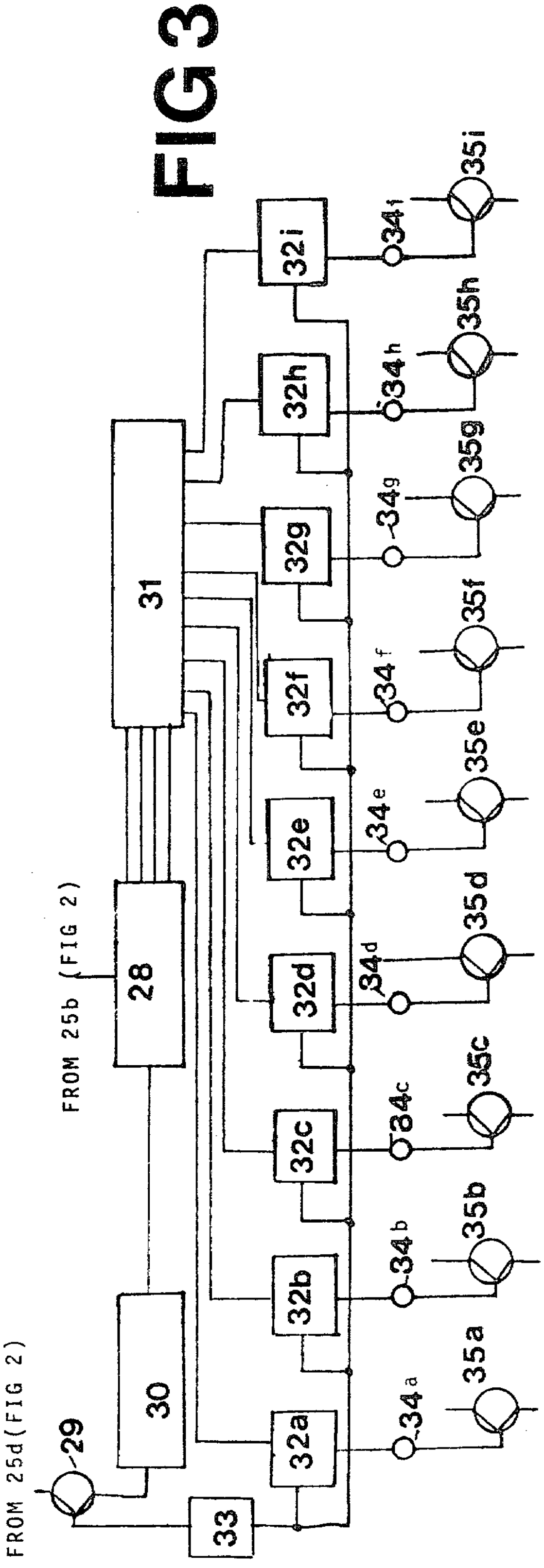
FIG. 3 shows counting means, decoding means and outputs to nine sets of light emitting diodes, each set associated with one of nine on-loading stations.

Referring to FIG. 3 input from the anode of thyristor 25*b* provides, via a suitable resistor and capacitor, a resetting voltage to a decade counter 28. Input from the anode of thyristor 25*d* is applied via a triode 29 to a Schmitt trigger 30 and hence to the counting input of the said counter 28, the four binary outputs of which are inputs to a decoder 31, having outputs zero to nine. All except the zero output are applied to dual input NOR gates 32*a,b,c,d,e,f,g,h,i,* the second inputs coming from thyristor 25*d* via an inverter 33. The output of the said dual input NOR gates is applied to light emitting diodes 34*a,b,c,d,e,f,g,h,i,* in series with the base circuits of transistors 35*a,b,c,d,e,f,g,h,i,* the collector circuits of which control light emitting diodes at the on-loading stations. At the end of a count of nine the counter is again reset.

Figure 4:
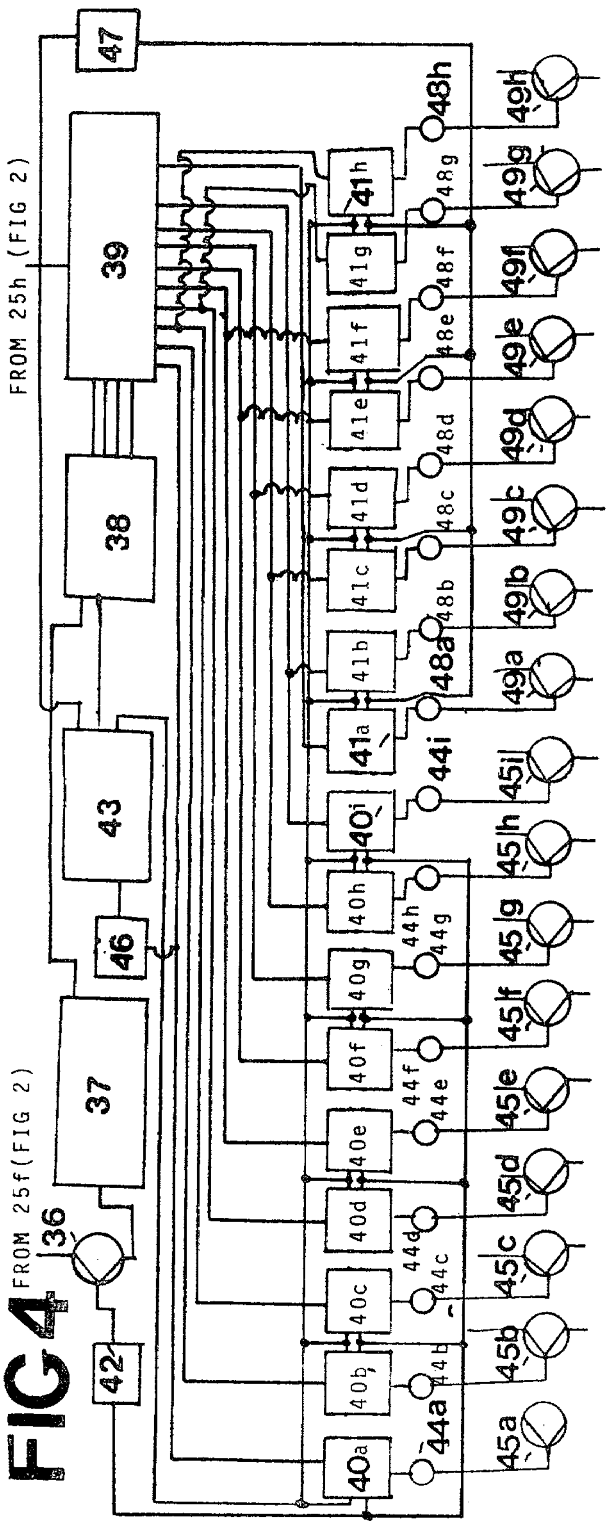
FIG. 4 shows counting means, decoding means and seventeen outputs distributed to nine sets of nine light emitting diodes, each set associated with one of nine off-loading stations.

Referring to FIG. 4 input from the anode of thyristor 25*f* is applied via a triode 36 to a second Schmitt trigger 37 and hence to the counting input of a counter 38, the four binary outputs of which are inputs to a decoder 39. The thyristor 25*h* provides a resetting potential for this counter. The outputs of the decoder 39 are arranged to provide seventeen distinct outputs per cycle through triple input NOR gates 40a,b,c,d,e,f,g,h,i, and 41a,b,c,d,e,f,g, and h. Thus, outputs one to nine are applied to nine gates 40a,b,c,d,e,f,g,h,i, aforesaid, the second input coming from the thyristor 25f, via an inverter 42 and the third input coming from the output of a third counter 43, which normally stands at zero. Thus, the NOR gates 40a,b,c,d,e,f,g,h,i aforesaid provide nine inputs which are applied each to a light emitting diode 44a,b,c,d,e,f,g,h,i, in series with the base circuit of a transistor 45a,b,c,d,e,f,g,h,i, the collector loads of which control light emitting diodes at the off-loading stations. On the count of nine the "nine" output of decoder 39 aforesaid is applied, via an inverter 46 to reset counter 43 aforesaid to "nine", thus ensuring that a "one" appears at at least one of its binary outputs. Thus, "one" when inverted by an inverter 47 is applied to eight triple input NOR gates 41a,b,c,d,e,f,g,h. To each of these comes an input from outputs nought to seven of the decoder 39 aforesaid, while the third input in each case comes from the thyristor 25f via inverter 42. Thus, a further eight outputs are applied to eight light emitting diodes 48a,b,c,d,e,f,g,h and transistors 49a,b,c,d,e,f,g,h, thus giving seventeen outputs in all, in the course of a cycle of twenty four turns of the slower moving annulus aforementioned. After seventeen outputs have been achieved the counters are reset by a signal from thyristor 25h.

Figure 5:
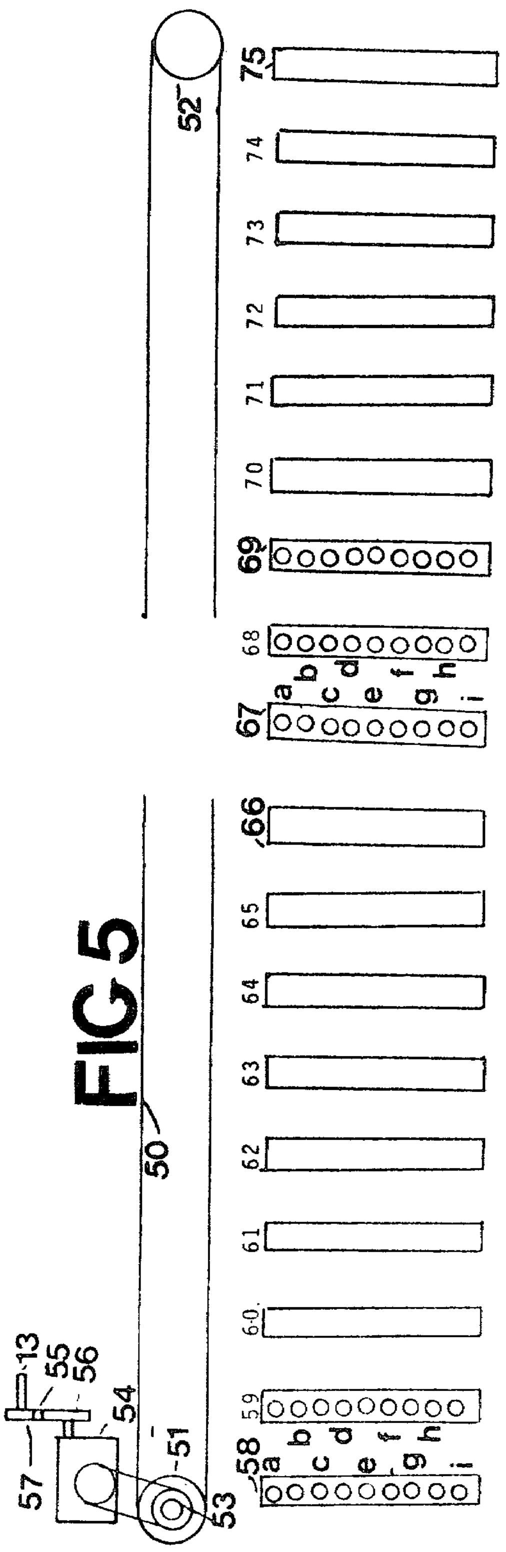
FIG. 5 shows an endless conveyor with means to provide a mechanical drive to the output shaft of FIG. 1, together with nine on-loading stations and nine off-loading stations.

Referring to FIG. 5, an endless conveyor 50 passes over drums 51 and 52, the former mounted on a driving shaft 53 which also provides an input to a worm and wheel gear box 54, the output of which drives the input shaft 13 aforesaid, via a timing belt 55 with sprockets 56, 57.

There are nine on-loading stations 58–66, equally spaced and each having nine light emitting diodes 58a,b,c,d,e,f,g,h,i,; 59a,b,c,d,e,f,g,h,i; 60a,b,c,d,e,f,g,h,i; 61a,b,c,d,e,f,g,h,i; 62a,b,c,d,e,f,g,h,i; 63a,b,c,d,e,f,g,h,i; 64a,b,c,d,e,f,g,h,i; 65a,b,c,d,e,f,g,h,i; and 66a,b,c,d,e,f,g,h,i respectively. There are also nine off-loading stations 67–75, each having nine light emitting diodes 67a,b,c,d,e,f,g,h,i; 68a,b,c,d,e,f,g,h,i; 69a,b,c,d,e,f,g,h,i; 70a,b,c,d,e,f,g,h,i; 71a,b,c,d,e,f,g,h,i; 72a,b,c,d,e,f,g,h,i; 73a,b,c,d,e,f,g,h,i; 74a,b,c,d,e,f,g,h,i; and 75a,b,c,e,f,g,h,i respectively. The off-loading stations are also equally spaced but at any arbitrary distance from the on-loading stations.

The gear ration of the said worm and wheel gear box 54 is such that a consignment on the belt will move from one on-loading station to the next adjacent on-loading station in the course of one quarter rotation of the disc 1 aforesaid, and likewise for off-loading stations. The annular rings 3, 4 are so phased in relation to their associated discs that a consignment placed on the conveyor belt at the first (most upstream) on-loading station 58, when the light emitting diode 58a is "on" will arrive at the first off-loading station 67 when the light emitting diode 67a is "on". The said transistors 35a,b,c,d,e,f,g,h,i, when conducting, supply power to nine light emitting diodes each namely; 58a,59b,60c,61d,62e,63f,64g,65h,66i; 58b,59c,60d,61e,62f,63g,64h,65i,66a; 58c,59d,60e,61f,62g,63h,64i,65a,66b; 58d,59e,60f,61g,62h,63i,64a,65b,66c; 58e,59f,60g,61h,62i,63a,64b,65c,66d; 58f,59g,60h,61i,62a,63b,64c,65d,66e; 58g,59h,60i,61a,62b,63c,64d,65e,66f; 58h,59i,60a,61b,62e,63d,64e,65f,66g; 58i,59a,60b,61c,62d,63e,64f,65g,66h; respectively. The transistors 45a,b,c,d,e,f,g,h,i, when conducting, supply power each to light emitting diodes, namely: 67a,68b,69c,70d,71e,72f,73g,74h,75i; 67i;68a,69b,70c,71d,72e,73f,74g,75h; 67h,68i; 69a,70b,71c,72d,73e,74f,75g; 67g,68h,69i; 70a,71b,72c,73d,74e,75f; 67f,68g,69h,70i; 71a,72b,73c,74d,75e; respectively and transistors 49a,b,c,d,e,f,g,h, when conducting, supply power to light emitting diodes 67e,68f,69g,70h,71i; 72a,73b,74c,75d; 67d,68e,69f,70g,71h,72i; 73a,74b,75c; 67c,68d,69e,70f,71g,72h,73i; 74a,75b; 67b,68c,69d,70e,71f,72g,73h,74i; 75a; respectively.

Figure 6:
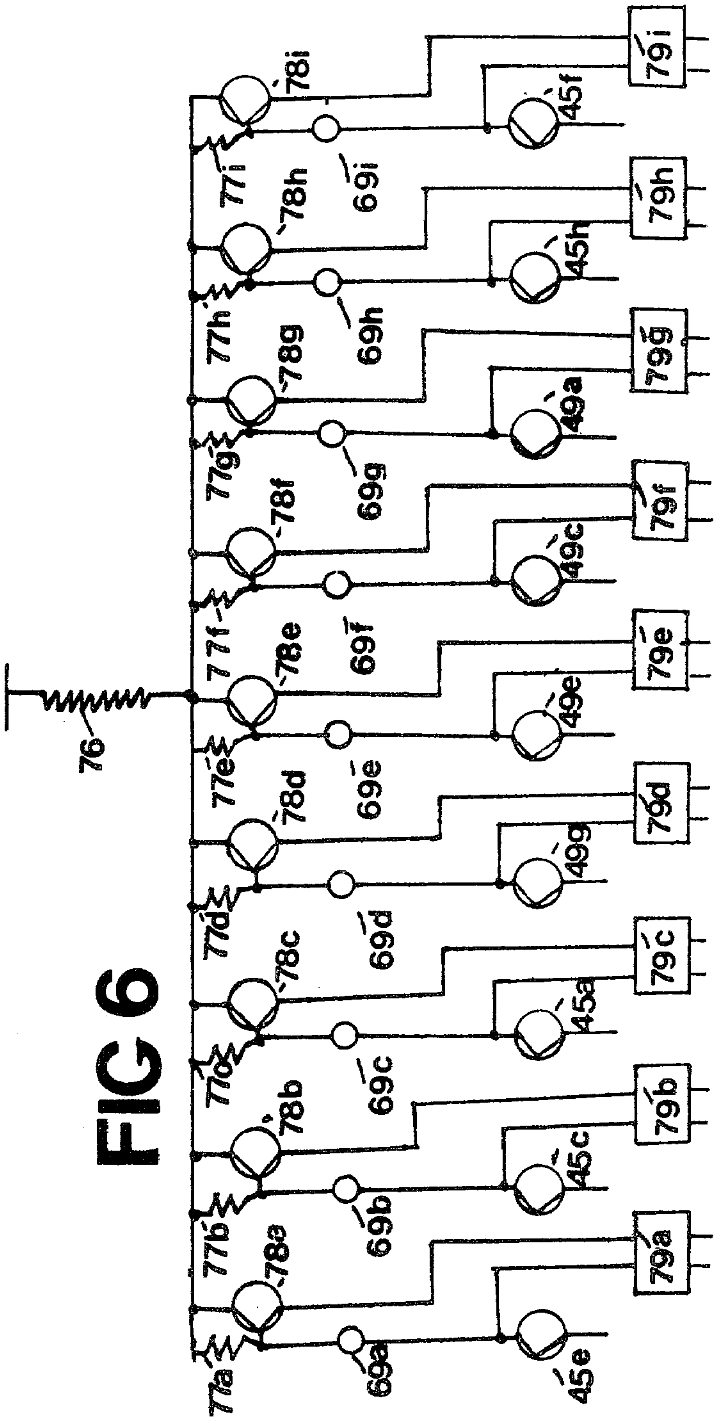
FIG. 6 shows means by which each one of the light emitting diodes at any station may activate an on-loading or off-loading device through the medium of an optical isolator.

Referring to FIG. 6, the circuitry at a typical on- or off-loading station is shown. For this purpose, off-loading station 69 is taken as typical. From the information associated with FIG. 5, above, it is evident that light emitting diodes 69a,b,c,d,e,f,g,h,i are associated with transistors 45e,45c,45a,49g,49e,49c,49a and 45h respectively. Accordingly, the figure shows power supply from a positive potential source, through a common resistor 76 to light emitting diodes 69a,b,c,d,e,f,g,h,i in parallel, via resistors 77a,b,c,d,e,f,g,h,i respectively and hence to the collectors of thyristors 45e,45c,45a,49g,49e,49c,49a,45h and 45f respectively. These transistors are understood to be of the positive collector type. The said resistors 77a,b,c,d,e,f,g,h,i are connected from emitter to base of transistors 78a,b,c,d,e,f,g,h,i, which are of the opposite kind, that is to say, the negative collector type. The collectors of these transistors are connected to the inputs of optical isolators 79a,b,c,d,e,f,g,h,i, and returned to the collectors of transistors 45e,45c,45a,49g,49e,49c,49a, and 45h aforesaid. The said optical isolators, which are a standard commerical product are understood to have an input circuit comprising a light emitting diode and a resistor of the order of 1500 ohms in series. It will be appreciated that only one of the nine parallel circuits can be conducting at any time, so that only one of the optical isolators can be energized. Since the function of such an isolator is to supply power of substantial magnitude, when activated, it is evident that each isolator may be adapted to control an on- or off-loading device, such as a pneumatic plunger, or sweeping arm or pickup device, or the like, independently of the others, so that, for example, at an off-loading station a consignment may be disposed of in one of nine distinct ways, according to the stations at which it was on-loaded.

What I claim is:

1. A conveyor control apparatus, comprising:

a rotary mechanical means for generating a first set of electrical signals, a second set of electrical signals, and a third set of electrical signals in correlation with the movement of a conveyor having a plurality of on-loading stations and a plurality of off-loading stations;

a counting means for counting said first set of electrical signals;

a decoding means responsive to said counting means for producing electrical outputs;

a gate means responsive to the coincidence of said electrical outputs and said second set of electrical signals;

said counting means and said decoding means including reset means responsive to said third set of electrical signals;

on-loading control indicator means responsive to said gate means;

off-loading indicator means responsive to said gate means;

said on-loading control indicator means associated with said plurality of on-loading stations whereby each member of said plurality of on-loading stations may receive a sequence of signals by which the effective times of on-loading may be indicated in order that consignments on-loaded at such times may reach their respective ones of said off-loading stations during periods of activation of said off-loading indicator means; and said off-loading indicator means associated with said plurality of off-loading stations whereby each member of said plurality of off-loading stations may receive a sequence of signals by which the effective times of off-loading may be initiated.

2. An apparatus as defined in claim 1, wherein said rotary mechanical means comprises:

an axle;

a first disc mounted on said axle;

a second disc mounted on said axle; a gear means for rotating said first disc through twenty-five revolutions and said second disc through twenty-four revolutions for an increment of movement of said conveyor;

said second disc including four equally spaced light apertures;

said first disc including nine light apertures associated with said four equally spaced apertures in said second disc;

a light source; and a phototransistor and coincidence signal detection means responsive to light shining through said apertures in said first and second discs for generating nine coincident signals in the course of twenty-four rotations of said second disc.

3. An apparatus as defined in claim 2, wherein:

said counting means comprises a decade counter responsive to said coincidence signals;

said decoding means comprises a decade decoder responsive to an output of said decade counter;

said gate means comprises nine gates responsive to nine outputs of said decade decoder; said plurality of on-loading stations comprises nine on-loading stations each of which includes a light;

further comprising;

means for coupling said nine gate means to respective ones of said nine on-loading station lights for activating individual ones of said lights in response to said coincidence signals; and means to determine the duration of activation of said lights.

4. An apparatus as defined in claim 3, comprising: means responsive to individual ones of said on-loading lights for activating an on-loading apparatus associated with said on-loading station of said on-loading light.

5. An apparatus as defined in claim 1, wherein said rotary mechanical means comprises:

an axle;

a first disc mounted on said axle and including an annular ring;

a second disc mounted on said axle and including an annular ring;

a gear means for rotating said first disc through twenty-five revolutions and said second disc through twenty-four revolutions in response to a predetermined incremental movement of said conveyor;

said second disc including four equally spaced apertures in the annulus thereof; said first disc including seventeen apertures in the annulus thereof in association with said four equally spaced apertures in said second disc;

a light source; and phototransistor and coincidence signal detection means for detecting seventeen coincidence signals during the course of twenty-four rotations of said second disc.

6. An apparatus as defined in claim 5, wherein:

said counting means comprises a decade counter and a counter gate means for coupling outputs of said decade counter to said decoding means;

said plurality of off-loading stations comprises nine individual off-loading stations and a light means at each individual off-loading station; said decoder means comprises means to provide seventeen output signals;

said gate means comprises seventeen individual gate circuits for selectively activating said off-loading station lights at times corresponding to individual ones of said seventeen coincidence signals; and means to determine the duration of activation of said off-loading station lights.

7. An apparatus as defined in claim 6, comprising: means to activate a specific off-loading device associated with one of said off-loading stations in response to the activation of said off-loading light associated with said off-loading station.

8. An apparatus as defined in claim 1, wherein: said rotary mechanical means comprises;

an axle, a first disc mounted on said axle and including an annular ring, a second disc mounted on said axle and including an annular ring, a gear means for rotating said first disc through twenty-five revolutions and said second disc through twenty-four revolutions in response to a predetermined incremental movement of said conveyor, said second disc including four equally spaced apertures in the annulus thereof, said first disc including seventeen apertures in the annulus thereof in association with said four equally spaced apertures in said second disc, said first disc including nine light apertures associated with said four equally spaced apertures in said second disc;

a light source; and a phototransistor and coincidence signal detection means responsive to light shining through said apertures in said first and second discs for generating nine coincident on-loading signals and seventeen coincident off-loading signals in the course of twenty-four rotations of said second disc;

said counting means comprises an on-loading decade counter responsive to said nine coincidence signals;

said decoding means comprises an on-loading decade decoder responsive to an output of said on-loading decade counter;

said gate means comprises nine gates responsive to nine outputs of said on-loading decade decoder; said plurality of on-loading stations comprises nine on-loading stations each of which includes a light;

means coupling said nine gate means to respective ones of said nine on-loading station lights for activating individual ones of said lights in response to said coincidence signals;

means to determine the duration of activation of said on-loading lights;

said counting means comprises an off-loading decade counter and a counter gate means for coupling outputs of said off-loading decade counter to said decoder means;

said plurality of off-loading stations comprising nine individual off-loading stations and a light means at each individual off-loading station; said decoder means comprises off-loading decoder means to provide seventeen output signals;

said gate means comprises seventeen individual gate circuits for selectively activating said off-loading station lights at times corresponding to individual ones of said seventeen coincidence signals; and means to determine the duration of activation of said off-loading station lights.

9. An apparatus as defined in claim 8 wherein said annular rings of said first and said second disc are adjustable relative to their associated discs for altering the phase of said seventeen off-loading coincidence signals relative to the phase of said nine on-loading coincidence signals.

10. An apparatus as defined in claim 8 wherein said coincidence signal detection means comprises a transistor including a collector responsive to signals from said four apertures in said second disc and a base responsive to signals from said nine apertures in said first disc whereby the coincidence of signals at said collector and said base create said nine coincident on-loading signals.

11. An apparatus as defined in claim 10 wherein said coincidence signal detection means comprises a second transistor including a collector responsive to signals from said four apertures in said second disc annulus and a base responsive to signals from said seventeen apertures in said first disc annulus, the coincidence of signals at said collector and said base resulting in input signals to said off-loading decade counter.

12. An apparatus as defined in claim 8 comprising means for activating a predetermined one of said off-loading lights and activating an associated off-loading station when a consignment arrives at said off-loading station which was placed on said conveyor at a predetermined and associated one of said on-loading stations when said predetermined on-loading station light was on and said station was activated.

13. An apparatus as defined in claim 12 wherein eighty-one consignments may be placed on said conveyor sequentially at nine points of time following a distinct route from said on-loading to said off-loading stations on a single conveyor track.

* * * * *